United States Patent [19]

Strong et al.

[11] Patent Number: 5,580,600
[45] Date of Patent: Dec. 3, 1996

[54] MONOUNSATURATED DAIRY PRODUCTS

[75] Inventors: Andrew L. Strong; Martin L. Strong; Maxwell J. Strong, all of Caringbah, Australia

[73] Assignee: Associated Food Technology Pty, Ltd., Caringbah, Australia

[21] Appl. No.: 481,134

[22] Filed: Jun. 7, 1995

Related U.S. Application Data

[63] Continuation of Ser. No. 162,143, May 27, 1994, abandoned.

[30] Foreign Application Priority Data

| Jun. 14, 1991 | [AU] | Australia | PK6670 |
| Nov. 13, 1991 | [AU] | Australia | PK9476 |
| Nov. 13, 1991 | [AU] | Australia | PK9477 |

[51] Int. Cl.⁶ .............................. A23C 9/15; A23C 9/154
[52] U.S. Cl. ..................... 426/585; 426/580; 426/602; 426/604; 426/607; 426/613
[58] Field of Search ................................ 426/585, 580, 426/602, 604, 607, 613

[56] References Cited

U.S. PATENT DOCUMENTS

| 1,816,339 | 7/1931 | Musher . | |
| 2,335,275 | 11/1943 | Hauser et al. | 99/63 |
| 2,703,285 | 3/1955 | Luther et al. | 99/2 |
| 2,923,628 | 2/1960 | Otto | 99/63 |
| 3,011,893 | 12/1961 | Kneeland | 99/63 |
| 3,355,298 | 11/1967 | Loter . | |
| 3,391,002 | 7/1968 | Little . | |
| 3,488,198 | 1/1970 | Bundus | 99/63 |
| 3,889,004 | 6/1975 | Schmidt et al. . | |
| 4,803,087 | 2/1989 | Karinen . | |
| 5,063,074 | 11/1991 | Kahn et al. | 426/585 |
| 5,104,676 | 4/1992 | Mahmoud . | |
| 5,104,677 | 4/1992 | Behr et al. . | |
| 5,200,226 | 4/1993 | Rodriguez . | |

FOREIGN PATENT DOCUMENTS

| 222820 | 1/1958 | Australia . | |
| 0091331 | 10/1983 | European Pat. Off. . | |
| 0255660 | 2/1988 | European Pat. Off. . | |
| 0294692 | 12/1988 | European Pat. Off. . | |
| 55-148056 | 11/1980 | Japan . | |
| 55-148055 | 11/1980 | Japan . | |
| 55-159753 | 12/1980 | Japan . | |
| 57-2649 | 1/1982 | Japan . | |
| 59-118043 | 7/1984 | Japan . | |
| 820995 | 9/1959 | United Kingdom . | |
| 2255489 | 11/1982 | United Kingdom . | |
| WO890988 | 10/1989 | WIPO | 426/585 |

OTHER PUBLICATIONS

T. J. Weiss, Food Oils and their Uses, Second Edition, 1983, pp. 76–79, Ellis Horwood Limited, Publishers, Chichester, England.
B. F. Haumann, Monounsaturate Sales Grow, Inform, Jun. 1992, vol. 3, No. 6.
K. Dotson, Canola Gaining, Inform, Jul. 1991, vol. 2, No. 7.
Flavor Problems and Future Solutions, May 1991, p. 58, Food Engineering.
L. O'Neil, Oils Market Reflects Major Shifts In Tastes, Foodweek, Apr. 7, 1992, pp. 12–13.
H.-D. Belitz et al., Food Chemistry—Changes in Acyl Lipids of Food, 1986, pp. 154–168, Springer Verlag, New York, New York.
W. F. Nawar, Food Chemistry—Lipids, 1985, pp. 139–197, Marcel Dekker, Inc., New York, New York.
J. M. DeMan, Principles of Food Chemistry, pp. 58–67, 1976, The Avi Publishing Company, Inc., Westport, Connecticut.
T. Richardson et al., Developments in Dairy Chemistry–2, Lipid Oxidation, pp. 241, 260–265, Applied Science Publishers, New York, New York.
T. P. Coultate, Food–The Chemistry of its Components, 1984, pp. 50–55, London: The Royal Society of Chemistry.
D. A. Lillard, Effect of Processing on Chemical and Nutritional Changes in Food Lipids, Jan. 1983, pp. 61–67, Journal of Food Protection, vol. 46, No. 1.
E. William Evans, Interactions of Milk Components in Food Systems, Edited by Birch and Lindley, 1986, pp. 250–273, Elsevier Applied Science Publishers.
H. W. Modler et al., Physical and Chemical Stability of Soybean Oil–Filled Milk, vol. 35 (1970), pp. 305—305, Journal of Food Science.
Richard Davids, Is That *Really* Milk They're Drinking?, Nov. 1968, pp. 61–62, The Reader's Digest.
Clem Honer, Cutting Cholesterol and Saturated Fats, Jan. 1991, pp. 42–44, Dairy Field.
Richard H. Purdy, High Oleic Sunflower: Physical and Chemical Characteristics, vol. 63, No. 8, Aug. 1986, pp. 1062–1066, JAOCS.
S. W. Arenson, Imitation Dairy Products, Food Engineering, Apr. 1969, pp. 76–77.
M. Kako and P. Sherman, The Stability of Imitation Milks Prepared From Corn Oil, Milchwissenschaft, vol. 29, No. 12, pp. 733–737.
Karen Lautsen, Vegetable Fats in the Dairy Industry, Dairy Industries International, vol. 51, No. 2, pp. 1 and 13, Feb. 1986.
Alton E. Bailey, Industrial Oil and Fat Products, Second completely Revised and Augmented Edition, pp. 150–167, 1951, Interscience Publishers, Inc., New York.

*Primary Examiner*—Helen Pratt
*Attorney, Agent, or Firm*—Staas & Halsey

[57] ABSTRACT

A monounsaturated filled skim milk dairy product including, an emulsifier and a vegetable oil. The vegetable oil is derived from rape seed or sunflower seed and contains at least 70% by weight of monounsaturated oleic acid, no more than 12% by weight of polyunsaturated linoleic acid and no more than 0.5% by weight of polyunsaturated linolenic acid. The emulsifier may include one or more of mono-glycerides, di-glycerides, non-fat milk solids, including milk protein, and phospholipids. The filled dairy product may also include a polysaccharide or oligosaccharide modifier and a carbohydrate gel stabiliser.

12 Claims, No Drawings

MONOUNSATURATED DAIRY PRODUCTS

This application is a continuation of application Ser. No. 08/162,143, filed May 27, 1994, now abandoned.

FIELD OF THE INVENTION

The present invention relates to monounsaturated dairy products and intermediates for use in the production of such dairy products. The invention is particularly suitable for the production of monounsaturated filled milks.

BACKGROUND ART

In many westernised countries including the United Kingdom and the United States of America, cardiovascular disease is a major cause of death. Public health campaigns supported by governments are being actively promoted in order to try to reduce mortality and morbidity from this cause. In almost all national dietary guidelines a prime recommendation is to reduce tonal dietary fat intake and in many a reduction in saturated fat is particularly stressed. In countries with a well-developed dairy industry, dairy products constitute a significant portion of the fat in the average diet, and because saturated fatty acids constitute about 60% of the total fatty acids in milk fat, dairy products account for an even larger proportion of the saturated fat consumed. For example, in the UK dairy products constitute 29% of the total fat in the average diet and 42% of the dietary saturated fatty acids.

Such has been the acceptance of the consensus view of the role of dietary saturated fatty acids in the aetiology of cardiovascular disease that, irrespective of the validity of the scientific evidence for those views, the dairy industry in those countries has come under pressure. In many such countries, liquid milk and butter sales have fallen steadily and the proportion of milk sales represented by low fat milks has increased dramatically.

Numerous clinical trials have shown that when a saturated fat diet is replaced by an unsaturated fat diet there is generally a fall in total serum cholesterol levels. It is widely conceded that dietary saturated fats cause an increase in cholesterol biosynthesis resulting in an increase in serum cholesterol levels regardless of the cholesterol content of the diet.

Polyunsaturated fats in the diet generally result in a lowering of both low-density lipoprotein cholesterol as well as high-density lipoprotein cholesterol. Monounsaturated fats on the other hand selectively lower the harmful low-density lipoprotein cholesterol (LDL) without altering the high-density lipoprotein cholesterol which, because of its ability to mobilize the LDL serum cholesterol so that it can be removed by the liver, is considered to be healthy.

With these nutritional problems in mind, a number of attempts have been made to replace the cholesterol-containing saturated fats in dairy products, particularly liquid milks, with polyunsaturated, cholesterol-free, vegetable oils and fats. Such milks are known generically as filled milks.

Natural milk comprises an emulsion of saturated fats in water. The emulsion is stabilised by the milk fat globule membrane, this membrane consists of a complex mixture of proteins, phospholipids, glycoproteins, triglycerides, cholesterol, enzymes and other minor components and acts as a natural emulsifying agent enabling the fat to remain dispersed throughout the aqueous phase of the milk. The filled milks previously proposed have utilised known emulsifying agents to maintain the polyunsaturated fats and oils in an emulsified state in the milk from which the natural saturated fats have been removed i.e. skim milk.

When the saturated milk fats are removed from whole milk the organoleptic properties of the remaining "skim milk" such as mouth-feel, flavor etc. are unacceptable to most consumers of liquid milk and milk products derived therefrom. It is not possible to simply recombine this skim milk with other non-dairy fats such as vegetable oils etc., without developing poor mouth-feel, off-flavors etc.

The present invention is directed to an alternative to such known filled dairy products and to premix preparations for use in producing dairy products according to this invention.

BRIEF DESCRIPTION OF THE INVENTION

In a first aspect the present invention consists in a monounsaturated filled dairy product comprising skim milk, a vegetable oil containing at least 70% by weight of monounsaturated oleic acid, no more than 12% by weight of polyunsaturated linoleic acid and no more than 0.5% by weight of polyunsaturated linolenic acid, and an effective amount of an emulsifier capable of maintaining the oil as a stable emulsion in the skim milk and a stabiliser and/or modifier selected from the group comprising:

a) a polysaccharide or oligosaccharide; and b) a carbohydrate gel being an alginate, a guar gum or a carboxymethyl cellulose.

The present inventor has found that the use of a vegetable oil having a very high proportion of the monounsaturated oleic acid avoids the problems associated with conventional filled milks which have contained a substantial proportion of the added oil in the form of polyunsaturated fats and oils. These polyunsaturated fats and oils have given rise to rancidity and off flavors in the filled milk even after relatively short periods of storage. It has been found that the high oleic vegetable oils used in the present invention do not develop this rancidity or off flavours even after considerable periods of storage. The filled milk according to this invention has the added advantage that the majority of the fatty acids present in the product are the nutritionally advantageous monounsaturated fatty acids which serve to lower the harmful low density lipoprotein cholesterol.

The skim milk to which the high oleic vegetable oil is added will typically have a fat content of less than 0.1% by weight. This may be fresh liquid skim milk or skim milk that has been reconstituted from skim milk powder. It is desirable that the non-fat solids component of the skim milk be increased to improve the mouth feel of the finished product. This advantageously may be done by adding to the skim milk a concentrated skim milk, a skim milk powder or purified or semipurified milk solids such as milk proteins including sodium caseinate. If desired for use by people showing lactose intolerance the skim milk may be enzymatically treated to at least reduce its lactose content before it is formulated into a filled milk.

The vegetable oil is preferably derived from rape seed or sunflower seed however other sources of such oils may be used. These oils may need to be hydrogenated to some extent to increase the oleic acid content above that of the natural oil. The monounsaturated oleic acid, which is a C18:1 fatty acid, preferably comprises from 75 to 85% by weight of the vegetable oil and more preferably at least 78% by weight of it. The linoleic acid (C18:2) is preferably present in the vegetable oil in a maximum of 6% and the linolenic acid (C18:3) in a maximum of 0.1% by weight.

The oil may be emulsified in water and the emulsion added directly to the skim milk or alternatively the oil may be emulsified and the emulsion spray dried to form a powder which can be added to the skim milk. The emulsifier system may need to be altered depending upon which of the above systems is to be used to produce the filled milk according to the invention.

The monounsaturated oil preferably comprises more than 1% by weight, and most preferably 1.2% to 5% by weight, of the filled milk. When the oil is formulated as a premix the oil preferably comprises at least 74% by weight of the premix. More preferably it comprises 74% to 79% by weight of the premix.

The emulsifiers for use in the present invention are preferably approved food grade emulsifiers and more preferably selected from the group comprising:

a) mono- and di- glycerides such as glyceryl mono stearate;

b) non-fat milk solids including milk proteins;

c) phospholipids such as lecithin; and d) mixtures of two or more of the above.

Other emulisifiers may be used in addition to or together with one or more of the above mentioned emulsifiers. It is particularly preferred in the case of liquid emulsions which are to be added directly to the skim milk the emulsifier preferably comprises a mixture of a mono- and di- glyceride emulsifier and a carbohydrate gum such as sodium alginate or guar gum. In the case in which the oil is to be emulsified and spray dried to form a premix which can be added to the skim milk it is possible to use the natural emulsifiers present in non-fat milk solids, supplemented if desired with additional milk proteins, to form an emulsion which can be spray dried to form a premix which can be added to skim milk. In this case, however, it is desirable to add an additional emulsifier or stabiliser such as a carbohydrate gum to the premix before or during its addition to the skim milk to produce a fully stable filled milk product.

The emulsifier or mixture of emulsifiers is preferably present in an amount of up to 5% by weight of the filled milk. In the case of the premix a commensurate amount of emulsifier must be present in the premix to yield the desired quantity of emulsifier in the filled milk.

The filled milk preferably also includes a stabiliser and modifier to stabilise the emulsion of the oil in the skim milk. Such stabilisers and modifiers are also useful in allowing a free flowing premix to be formed. These stabilisers and modifiers preferably include carboydrate gels such as sodium alginate, guar gum, microcrystalline cellulose and carboxymethylcellulose; protein gels such as stabilised pectin; polysaccharides and oligosaccharides; and mixtures of the above.

The filled milk, or the premix from which it may be made, preferably includes a water soluble polysaccharide or oligosaccharide not only as a stabiliser/modifier but also to provide a low degree of sweetness offsetting the oiliness provided by the added monounsaturated vegetable oil. This saccharide also increases the viscosity of the final milk product and gives a more "bulked-up" mouth feel. The most preferred polysaccharide is maltodextrin derived from the controlled hydrolysing of starch, however, other saccharides could be used with equal advantage. Corn syrup solids is another preferred source of polysaccharides for use in the present invention. If desired mono or disaccharides such as glucose, sucrose, maltose and lactose can also be added to the filled milk or the premix.

In the case that the oil is emulsified in water and added directly to the skim milk it is preferred to add the emulsifier and the poly- or oligo- saccharide to hot water and to then stir in the oil. The resulting emulsion is then added to liquid skim milk to which has been added liquid skim milk concentrate. The filled milk so produced is then homogenised, pasturised and packaged.

In the case that the oil is to be formed a spray dried premix it is preferred that the above procedure is followed except that additional milk solids are added directly to the oil emulsion before it is spray dried. This assists in forming a stable free flowing powder readily dissolved in skim milk to form the desired monounsaturated filled milk product. In this case all of the emulsifier may be added to the emulsion before it is spray dried, an alternative is to provide additional emulsifier or stabiliser for addition to the skim milk at the time of addition of the premix. In a particularly preferred embodiment of the invention the additional emulsifier or stabiliser comprises a mixture of carboxymethylcellulose mixed with microcrystalline cellulose, preferably in equal parts. It is known that carboxymethylcellulose can separate milk proteins solution, however, when mixed with monocrystalline cellulose it has been found that this effect is suppressed.

The filled milk produced according to the present invention may be consumed as liquid milk or converted into manufactured products such as ice cream, soft serve ices, thick shakes, dairy spreads and the like. These products are high in monounsaturated fats and low in cholesterol.

BEST METHOD FOR CARRYING OUT THE INVENTION

Hereinafter described by way of example only are preferred embodiments of the invention.

Example 1

A premix was prepared containing:

(a) 74.53% by weight canola oil containing 78% by weight oleic acid, 6% linoleic acid and 0.1% linolenic acid (a suitable oils is sold by EOI Pty Ltd of Sydney Australia under the trade mark "FRUCO"), (b) 4.08% by weight of sodium caseinate, (c) 10.69% by weight non-fat milk solids, and (d) 10.69% by weight of maltodextrin.

The components were mixed together and water added. The resulting mixture was emulsified in a high shear mixer to produce an emulsion containing about 45% solids by weight. The emulsion was spray dried in a spray drier with an inlet temperature of approximately 200° C. and an outlet temperature of about 90° C. to produce a powdered premix.

The premix was mixed with a dry powder stabiliser comprising equal parts by weight of carboxymethylcellulose and microcrystalline cellulose. The stabiliser was prepared by i) hydrolysing purified cellulose derived from cotton linters with 2.5N hydrochloric acid at a temperature of 105° C. for 15 minutes, ii) neutralising the hydrolysed cellulose solution so formed, iii) adding a solution of carboxymethylcellulose such the combined solution contains equal weight of carboxymethylcellulose and hydrolysed cellulose, and iv) spray drying the mixed solution.

The stabiliser was mixed with the premix and the mixture blended into skim milk to produce a filled milk having a non-fat solids content of about 11%. In order to fully develop the properties of the stabiliser the blended milk was passed twice through a homogeniser. This developed the gel lake qualities of the microcrystalline cellulose and prevent it giving a powdery mouth-feel to the milk. The final stabiliser concentration in the filled milk was approximately 0.2% by weight.

The filled milk so produced had a low level of saturated fats and cholesterol; had a high level of monounsaturated fats; was low in calories; and had a good mouth-feel and flavor.

Example 2

To make five liters of a monounsaturated filled liquid milk containing 1.35% wt of the monounsaturated oil 22.0 g of a powder containing:

| | |
|---|---|
| Maltodextrin | 54.5% by weight |
| Polymuls GMS 65-105 (a proprietary emulsifier comprising glyceryl mono stearate) | 27.3% by weight |
| Sodium Alginate | 9.1% by weight |
| Guar Gum | 9.1% by weight | was mixed into 375 ml of water at 80° C. and mixed vigorously until dissolved (approx. 5 mins). 65 g of the canola oil used in Example 1 was then heated to 40° C. and added to the above mixture and thoroughly stirred for 5 to 10 mins.

4325 ml liquid skim milk (10% solids 0.1% fat) and 300 ml of concentrated skim milk (33.5% solids, 0.1% fat) were separately mixed together at 4° C. The oil emulsion prepared as described above was added to the milk and mixed for a further 5 to 10 mins.

The resulting filled milk was pasteurised at 75°–80° C. and homogenised at 2500–3500 psi. The product was then chilled and packaged. It was found to have a good flavor and mouth feel and was stable for at least 14 days under refrigeration without developing off flavours or rancidity. When subjected to Ultra High Temperature (UHT) treatment this filled milk was stable for at least 6 months without developing off flavour or rancidity.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A monounsaturated filled liquid milk dairy product comprising skim milk, a vegetable oil derived from rape seed or sunflower seed and containing at least 70% by weight of monounsaturated oleic acid, no more than 12% by weight of polyunsaturated linoleic acid and no more than 0.5% by weight of polyunsaturated linolenic acid, an effective amount of an emulsifier capable of maintaining the oil as a stable emulsion in the skim milk, a polysaccharide or oligosaccharide modifier for the product and a carbohydrate gel stabiliser for said emulsion, said carbohydrate gel stabiliser comprising an alginate, a guar gum or a carboxymethyl cellulose.

2. A filled dairy product as claimed in claim 1 in which the vegetable oil comprises from 75% to 85% by weight of the oleic acid, no more than 6% by weight of the linoleic acid and no more than 0.1% by weight of the linolenic acid.

3. A filled dairy product as claimed in claim 1 in which the vegetable oil comprises from 1 to 5% by weight of the filled milk.

4. A filled dairy product as claimed in claim 1 in which the emulsifier comprises one or more of mono-glycerides, di-glycerides, non-fat milk solids, including milk protein, and phospholipids.

5. A filled dairy product as claimed in claim 1 in which the emulsifier comprises non-fat milk solids and either a mono- or di-glyceride or additional milk protein.

6. A filled dairy product as claimed in claim 1 in which the stabiliser comprises a mixture of a carboxymethyl cellulose carbohydrate gel and a microcrystalline cellulose.

7. A filled dairy product as claimed in claim 1 in which the modifier comprises a polysaccharide including a maltodextrin or corn syrup solids.

8. A monounsaturated filled liquid milk dairy product comprising skim milk, a vegetable oil derived from rape seed or sunflower seed and containing at least 70% by weight of monounsaturated oleic acid, no more than 12% by weight of polyunsaturated linoleic acid and no more than 0.5% by weight of polyunsaturated linolenic acid, and an effective amount of an emulsifier capable of maintaining the oil as a stable emulsion in the skim milk.

9. A filled dairy product as claimed in claim 8 in which the vegetable oil comprises from 75% to 85% by weight of the oleic acid, no more than 6% by weight of the linoleic acid and no more than 0.1% by weight of the linolenic acid.

10. A filled dairy product as claimed in claim 8 in which the vegetable oil comprises from 1 to 5% by weight of the filled milk.

11. A filled dairy product as claimed in claim 8 in which the emulsifier comprises one or more of mono-glycerides, di-glycerides, non-fat milk solids, including milk protein, and phospholipids.

12. A filled dairy product as claimed in claim 8 in which the emulsifier comprises non-fat milk solids and either a mono- or di-glyceride or additional milk protein.

* * * * *